United States Patent
Riddle

(10) Patent No.: US 6,175,856 B1
(45) Date of Patent: *Jan. 16, 2001

(54) METHOD AND APPARATUS FOR DYNAMIC SELECTION OF COMPRESSION PROCESSING DURING TELECONFERENCE CALL INITIATION

(75) Inventor: Guy G. Riddle, Los Gatos, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/727,824

(22) Filed: Sep. 30, 1996

(51) Int. Cl.[7] .......................... G06F 15/16; G06F 15/177
(52) U.S. Cl. ........................................ 709/204; 709/227
(58) Field of Search .................. 395/200.34, 200.01, 395/200.16, 330, 705, 706, 200.36, 200.75; 354/284.4, 281.3, 514; 709/222, 227, 228, 230, 220, 204, 231, 263; 340/825.5, 825.44

(56) References Cited

U.S. PATENT DOCUMENTS

| | | | |
|---|---|---|---|
| 5,206,934 | * | 4/1993 | Naef, III .............................. 395/200 |
| 5,546,395 | * | 8/1996 | Sharma et al. ......................... 370/84 |
| 5,557,749 | * | 9/1996 | Norris .............................. 395/200.18 |
| 5,587,928 | * | 12/1996 | Jones et al. ....................... 364/514 A |
| 5,600,646 | * | 2/1997 | Polomski .............................. 370/263 |
| 5,621,894 | * | 4/1997 | Menezes et al. ................. 395/200.12 |
| 5,742,773 | * | 4/1998 | Blomfield-brown et al. ........ 395/200 |
| 5,859,979 | * | 1/1999 | Tung et al. ...................... 395/200.58 |

OTHER PUBLICATIONS

International Telecommunication Union, "Draft ITU–T Recommendation H.245, Line Transmission on Non–Telephone Signals; Control Protocol For Multimedia Communication," Nov. 2, 1995, pp. 1–189.

* cited by examiner

Primary Examiner—Glenton B. Burgess
Assistant Examiner—Tod Kupstas
(74) Attorney, Agent, or Firm—Blakely, Sokoloff, Taylor & Zafman

(57) ABSTRACT

A digital processing system and method which controls selection of a compressor in a communication system. In one embodiment, the method comprises receiving at the digital processing system information from a communication port, which information identifies decompression processing capabilities at a remote processor, and selecting in response to the information a particular compression process for use in compressing data for transmission to the remote processor.

21 Claims, 6 Drawing Sheets

METHOD AND APPARATUS FOR DYNAMIC SELECTION OF COMPRESSION PROCESSING DURING TELECONFERENCE CALL INITIATION

BACKGROUND

In teleconferencing applications between computers that are coupled by a networking or communication medium, data is generally compressed. Data is compressed for a number of reasons, including bandwidth limitations in the networking or communication medium, the information rate of the processors providing data to the medium, and the number of processors (and by the number of processes on each processor) trying to send data to the medium simultaneously.

Unfortunately, a large number of compression algorithms and processes are available, complicating data communication. Because the computer systems which are coupled for teleconferencing need not be of the same type, nor even operate on the same platform, and frequently do not have common teleconferencing applications or other telecommunication applications available thereon, compatibility problems frequently arise. Selecting a data compression process or algorithm where several are available, that is compatible with at least one decompression process or algorithm on a remote processor can be problematic, especially given the fact that by definition data communication between the computer systems is not yet possible. Selecting a codec, or "compression/decompression" pair of processes, on remote processors can thus be difficult.

When an application detects a problem, in that the data being received is compressed and that no decompression algorithm or process is available on the current processor to decompress the data, the application generally either terminates, or alternatively, a receiving processor on which an application has difficulty decompressing data may send a signal to the transmitting processor indicating that a problem has been detected, and requesting that the transmitting processor switch to a different compression algorithm. Thus, the transmitting processor will switch to different compression process and the receiving processor will determine if the received data can be decompressed.

Although this hit-and-miss approach to codec negotiation is occasionally successful, the options become unmanageable as the number of codecs or the number of parties involved in a teleconference increases.

Therefore, a need has arisen for an automatic codec selector that determines what decompressors are available on each message recipient, determines what compressors are available on the current transmitting processor, and selects the best codec possible. The need is also arisen for a codec selector that automatically changes from one codec to another as new members join, or old members leave, a teleconference.

SUMMARY OF THE INVENTION

An apparatus, according to one aspect of the present invention, comprises at least two data compressors, each of which compresses data from a transmitting processor according to a particular compression process, and a selector which is coupled to receive information from a communication medium. The selector receives information from a receiving processor and selects one of the two data compressors based upon the information received from the receiving processor. The selector is typically coupled to at least one of the data compressors in order to select the selected data compressor. A communication port is coupled to the selected data compressor to allow the selected data compressor to provide compressed data for transmission.

A method, according to one aspect of the present invention, comprises receiving, at a transmitting processor, information from a communication medium which provides an identification of decompression processing capabilities at a receiving processor and selecting, at the transmitting processor, a particular compression process for use in compressing and transmitting data from the transmitting processor to the receiving processor through the communication medium.

In one embodiment, the communication medium may be considered to include a transmitting modem to phone-line to receiving modem connection without any conventional networking systems. In another embodiment, the communication medium may be considered to include a network system of computers with or without phone-line connections.

Another aspect of the invention comprises a computer readable medium, containing executable computer program instructions, in a digital processing system. The instructions when executed in the system cause the system to perform the steps of receiving at the system information from a communication port which identifies decompression processing capabilities and selecting, in response to the information, a particular compression process for use in compressing data for transmission. The particular compression process will typically be compatible with at least one of the identified decompression capabilities.

It will be appreciated that video compressors are usually different than audio compressors. Therefore, the compressor negotiation process of the present invention is typically repeated twice. That is, a process according to the invention is performed for video data, and then another process according to the invention is performed for audio data. The process may also be repeated again if other data (e.g., a text file), to be compressed by yet another compressor, is transferred between the participants in a teleconference. It will also be appreciated that these negotiation processes may be performed substantially in parallel in time or serially. For example, the receiving processor may transmit information concerning video and audio decompressors at the same time or at different times. If data files (e.g., a text file) are to be transferred, the receiving processor may also transmit information concerning decompression capabilities for such data files. It will be appreciated that the various compressors may be categorized into two categories: lossy and lossless. The video and audio compressors are often lossy, and the compressors for data files, such as text files, are lossless.

BRIEF DESCRIPTION

DETAILED DESCRIPTION

The present invention will be understood more fully from the detailed description given below and from the accompanying drawings of various embodiments of the invention, which, however, should not be taken to limit the invention to the specific embodiments, but are for explanation and understanding only. Specific circuit devices, components, and processes and numerous details such as specific computer architectures, etc. are set forth in order to provide a thorough understanding of the present invention. In other instances, well-known structures and devices and processes are shown in block diagram form, rather than in detail, in order to avoid obscuring the present invention. However, it will be apparent to one of ordinary skill in the art that the present invention may be practiced without these specific details. In the present description, the terms "computer system", "work station", "machine", and "node" will be used interchangeably so as not to obscure the present invention needlessly. It will be understood that any of these may be replaced with a plurality thereof, or may be replaced with other intelligent systems such as servers, remote machines. Computer systems, servers, work stations, and other machines may be connected to one another across a communication medium including, for example, a network or networks. For simplicity of explanation, the term "communication medium" refers to any medium for communicating including conductors (e.g., common carrier telephone lines) or electromagnetic transmissions and includes simple point to point systems (e.g., a first modem coupled to a telephone line which is coupled to a second modem) or complex systems where communications originate from a computer in a first LAN (Local Area Network), transit through router systems and/or gateway systems, to a second LAN. The term communication medium also refers to the network of networks referred to as the Internet.

This disclosure contains copyrightable material which is reserved to the assignee of the present invention and is subject to copyright protection. The owner of this material has no objection to the facsimile reproduction by any one of the patent disclosure, as it appears in the Patent and Trademark Office patent files or records, but otherwise reserves all copyrights whatsoever.

Figure 1:
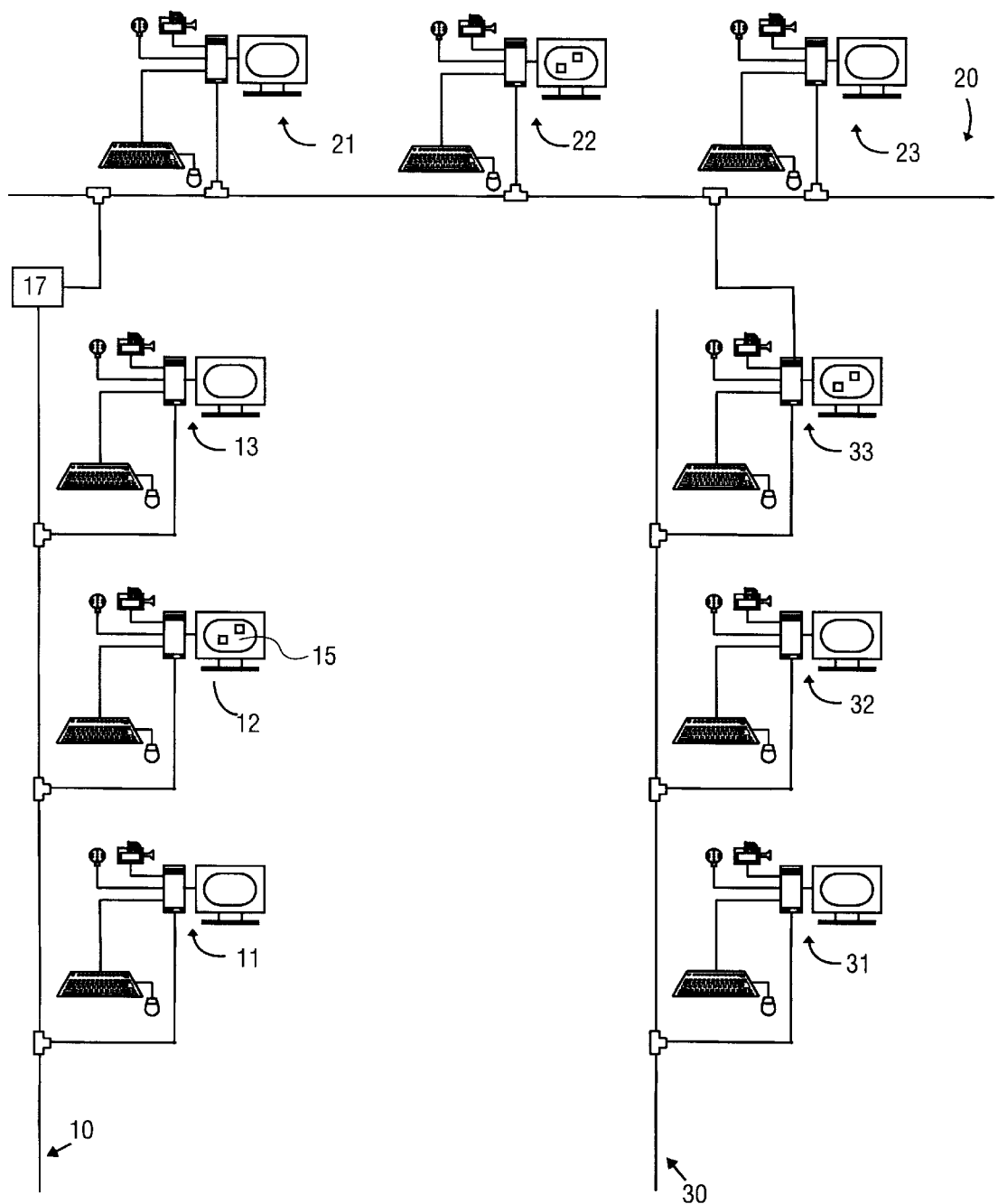
FIG. 1 shows a number of computer systems coupled via a network each have a teleconferencing application running thereon.

FIG. 1 shows three computer systems 11, 12, and 13 and a router 17 coupled to a network 10, and three computer systems 21, 22, and 23 coupled to another network 20, and another three computer systems 31, 32, and 33 coupled to another network 30.

As shown in FIG. 1, a number of computer systems coupled via a network may each have a teleconferencing application running thereon. A teleconferencing application 15 running on one computer system 12 sends teleconferencing messages over the networks to the teleconferencing applications running on the other computer systems 22 and 33 that are participating in the same teleconference. One computer system on a network may have running thereon a teleconferencing application that is engaged in more than one teleconference simultaneously. Some computer systems on the networks are not engaged in any teleconferencing. As shown in FIG. 1, some computer systems or router systems are coupled to more than one network, such as router system 17 and system 33; these computer systems or router systems can exchange information with other computer systems on each of the networks to which they are coupled, and may further serve as conduits (e.g., routers or gateways) by which computer systems on a first network can exchange information with computer systems on a second network. Some of the computer systems shown in FIG. 1 are personal computers having only one user. Furthermore, some of the computer systems may be Macintosh computers, while others operate on non-Macintosh platforms.

A network may be a local network connecting a few machines to one another, or a much wider network connecting large numbers of different types of machines. Many networks, especially wide area networks, connect machines operating on different platforms with different operating systems and different microprocessors, but provide consistent protocols to allow the machines to communicate. Various approaches to networking are known in the art, including distributed networks and centrally administrative networks.

Figure 2:
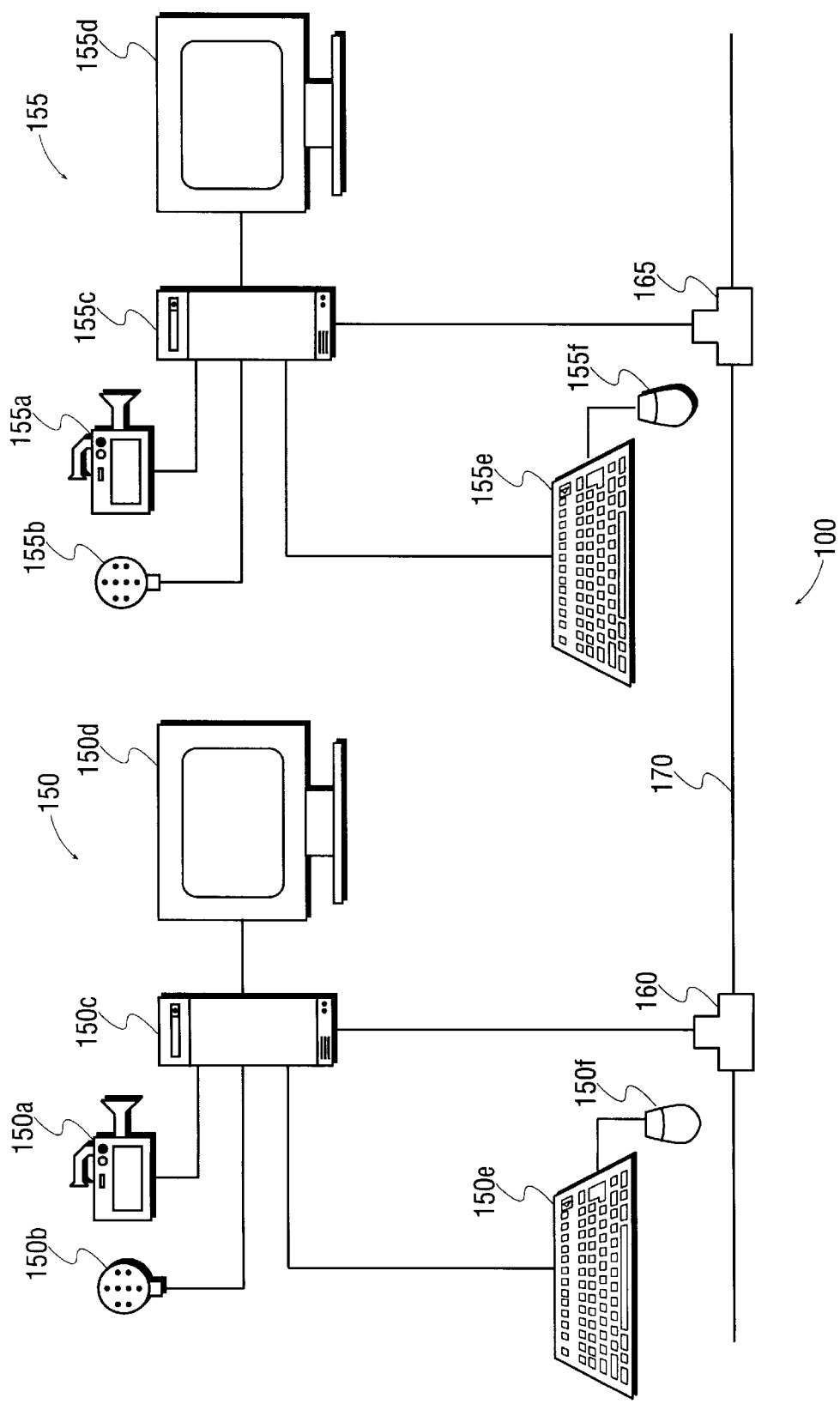
FIG. 2 shows one example of networked systems, specifically showing two systems on such a network or communication medium.

FIG. 2 shows one example of two interconnected systems, specifically showing two systems coupled by a communication medium. Processors 150C and 155C are each connected via a network adapter 160 and 165, respectively, to a network medium 170 which is a communication medium. The network medium 170 may be a digital bus, a video coaxial cable, a fiber optic cable, or other medium through which information may be transferred from one location to another and there may be intervening computer systems (not shown) which route or pass along the transmitted data. It will be understood upon reference to FIG. 2 that other arrangements are possible; for example, each of the processors 150C and 155C may be connected via other network adapters or other communication medium adapters to other network or communication media. Although reference is made to networks and network media, it will be apparent upon reference to the specification of the present invention that other communication media such as a telephone line or other link may be used. It will also be appreciated that the two systems each typically include at least one communication port which is used to couple its computer system to the communication medium. A communication port is typically an interface such as an Ethernet adapter or token ring adapter or "card" or an RS-232 interface (for connection to a modem); other types of interfaces which may be used as a communication port will be appreciated by those skilled in the art.

Each of the computer systems (or digital processing systems) shown in FIG. 2 has a video monitor such as 150D and 155D, a video input such as 150A and 155A, an audio input such as 150B and 155B, a keyboard input (155e or 150e) and a mouse (150f or 155f), and possibly other peripheral input/output devices connected thereto. Computer systems such as 150 and 155 may connect to a number of network media having differing types of media substrates, and further having different network protocols. Processor 150C and 155C each display images on the video monitor 150D and 155D, respectively, and receive inputs from other peripherals. Processors may also be running computer programs, including application programs and transport layer programs, that may call one another and serve one another, exchanging data, addresses, and control signals.

Figure 3:
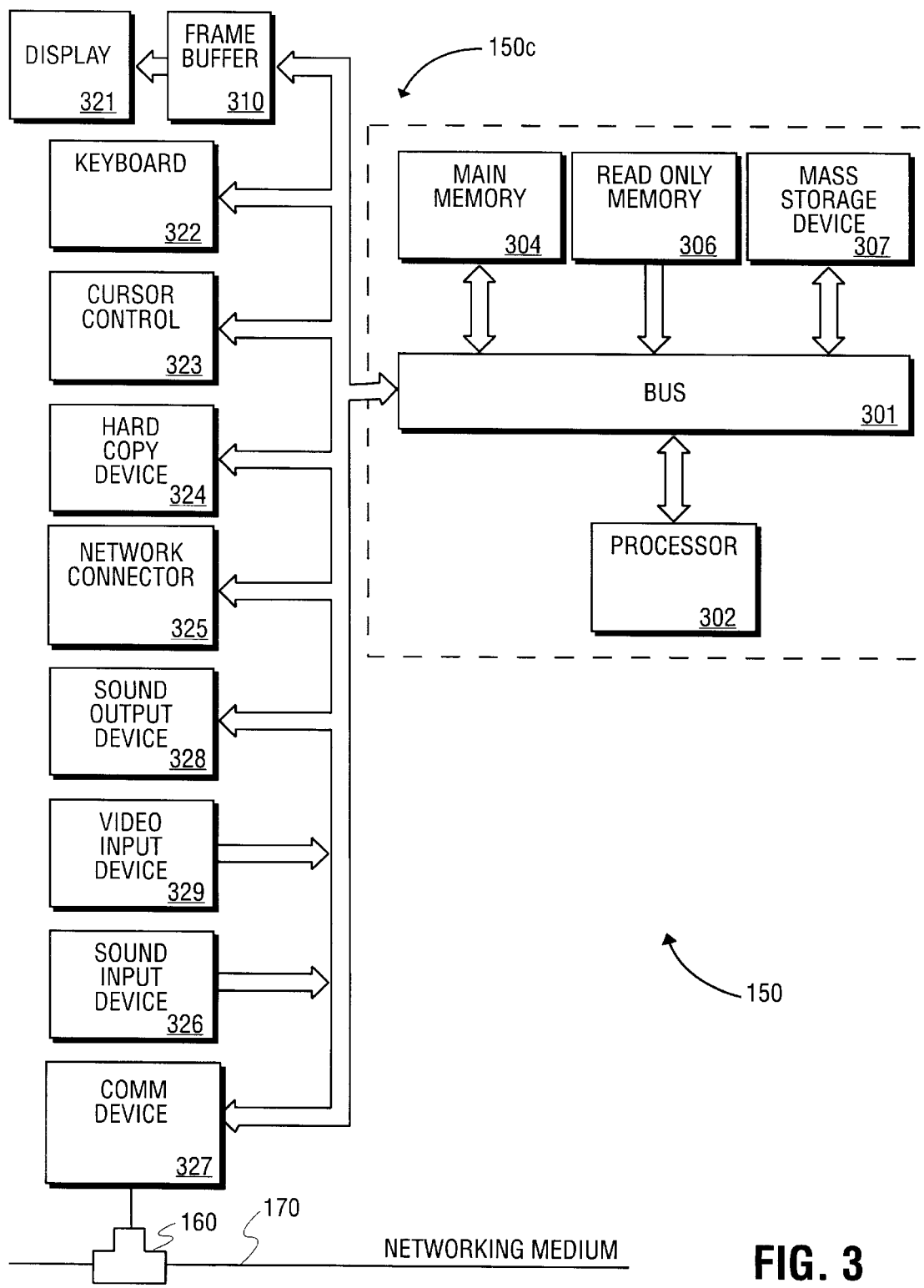
FIG. 3 shows the system components of a general computer system, having a number of component devices, coupled to a communication medium (e.g., a networking medium).

FIG. 3 shows the system components of a general computer system, such as the system 150, having a number of component devices.

As shown in FIG. 3, a processor 302 is connected via a system bus 301 to a main memory 304, a read only memory 306, and a mass storage device 307. The main memory may be a volatile memory array composed of dynamic random access memory. The read only memory 306 may be composed of a CD ROM, an initialization cache, erasable programmable read only memory, EEPROM, flash memory, or other read only memories. The mass storage device 307 may be configured as a disk drive writing to, and reading from, hard disks, floppy disks, or other storage devices. The processor 302 may be a Power PC microprocessor or an Intel Pentium microprocessor. Processor 302 may have a cache, either a write back or read through configuration, storing frequently used values in a static random access memory or other memory array, the cache in some configurations being coupled directly to main memory 304. Various other intelligent devices may be connected to the bus 301, including direct memory access devices.

Also shown in FIG. 3, various peripherals exchange information via bus 301 with the processor 302, main memory 304, read only memory 306, and mass storage device 307. These peripherals include a display 321, generally a video monitor or LCD. A keyboard 322 is also coupled to the bus 301, permitting alphanumeric entry. A cursor control 323 coupled to the bus 301 may be configured as a mouse or track ball. A sound output device 328, also coupled to the bus 301, may be configured as a loud speaker or a number of loud speakers. A video input device 329 may be configured as a video camera, a scanner, a fax input, or similar device, and is coupled to the processor 302 via bus 301. A sound input device 326, also coupled to the bus, may be configured as a microphone or a sound synthesizer, or may be a telephone connector. Finally, a communication device 327, also coupled to the bus 301, allows communication between any of the above devices and the network medium 170 via the network adapter 160. It will be recognized that communication device 327 could be a modem, or any network interface device, including a token network interface device or other FDDI device. It will also be apparent upon reference to the specification herein described that the communication medium may be any communication link, such as a telephone line or other link, and that the system shown in FIG. 3 may be coupled through the communication device 327, which may be a modem, to another system not shown in the figure. In some embodiments, the networking medium is a digital communication medium, allowing high speed digital communication between computer systems over the network.

A number of human users are collectively engaged in a teleconference using at least two systems such as 150 and 155. The users may be coworkers sharing work-related information, friends enjoying a personal conversation, or any other group of individuals discussing a subject of common interest. It will be apparent that, although human users are herein described, the computer systems may be servers, automatic database systems, control systems, or any other system capable of receiving and/or sending data.

At each computer system in one embodiment, a user selects a teleconferencing application. In one example, each of the teleconferencing applications sends and receives sound, video, and other data. In other examples, sound-only teleconferencing applications may be used, for example to exchange voice-only information, or to broadcast speeches, lectures, or music. In still other examples, control-only signals may be exchanged, such as in simple white-board applications. Regardless of the situation, however, compression of data can increase the speed, reliability, and performance, while reducing bit-errors by allowing greater error correction and data rate.

At a first computer system, video data is compressed according to a first compression algorithm. As stated above, video data is compressed for a variety of reasons, including bandwidth constraints of the network and of the I/O subsystems of the computer systems. The compressed video data is combined with other data (e.g., header data) into one data packet or several data packets. It will be recognized that the sound and other data may also be compressed, or may be in an uncompressed form. Each packet is addressed to each of the other computer systems having applications engaged in the same teleconference. Depending on whether a multicast feature is available, a separate packet may need to be sent to each recipient computer system, or it may be that a single packet can be received by more than one recipient.

Figure 4:
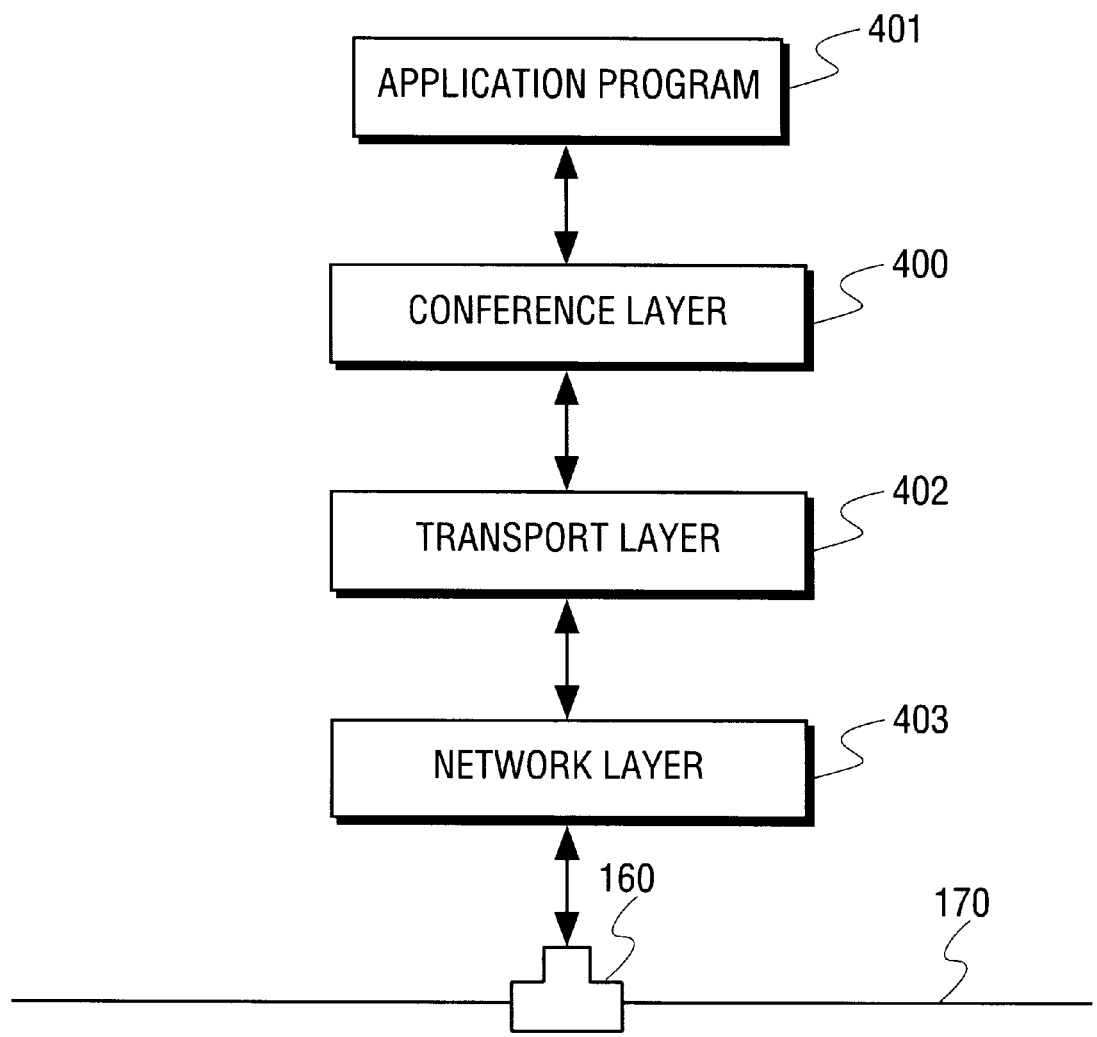
FIG. 4 shows various levels of abstraction which describe the operation of codec selection, which is largely invisible to the user and to the higher levels of processing, for example the application.

As shown in FIG. 4, various levels of abstraction describe the operation of codec selection, which is largely invisible to the user and to the higher levels of processing. In many embodiments of the present invention, applications do not become involved in codec selection; these processes occur at lower levels of management. Video and other data may be provided to a lower level process by an application, and the data are compressed by the lower level process into a packet, addressed to at least one recipient. In one embodiment, the audio and video data are processed by the conference layer 400 and passed in a compressed format to the layers 402 and 403 and then to the communication medium for communication to a receiving processor.

A distinction is made between teleconference initiation requests and packets of compressed data. Teleconference initiation requests are made by a first user using a teleconferencing application running on a first computer system, generally over a network, to a second user on another (second) computer system. In most cases, the first user and the second user are individuals and are the only users on the respective computer systems. In other cases, (for example, university, government, or institutional settings) at least one of the computers is a main frame or other multi-user, multi-task computer system. Teleconferencing initiation requests are therefore addressed to individual users, seeking to establish a teleconference. However, once a teleconference is established, teleconference data, including compressed data packets, are addressed to particular teleconferencing processes running on a computer system. Therefore, in most embodiments, recipients are identified by addresses.

Once a teleconference is established, packets may be addressed over the network to any of the application-level teleconferencing processes running on any computer systems in the network. With multi-cast, packets may be addressed to more than one process at a time.

The packet must be in a form that can be decompressed by the recipients. To be so decompressed, the packet must be compressed by the sender according to a compression formula corresponding to a decompression formula available on the recipient. The pair of formulas are collectively the "codec," or compression/decompression, formulas.

In some embodiments of the present invention, the sending computer system has available to it more than one compression algorithm. In such cases, one embodiment of the present invention includes a step of ranking the compression algorithms in an order of preference. The ranking generally is selected to maximize or minimize some value, bandwidth (data rate) being an efficient example where the highest data rate is ranked the highest. A teleconferencing application operating according to this embodiment of the present invention sends a packet compressed according to the best codec available at the sender (the process sending the packet) to all recipients (processes receiving the packet) in the teleconference. The "best" codec is the codec on the sending computer system that provides the greatest data rate, yet is decompressible on any and all packet recipients. Because some codecs and compression schemes are better (that is, have a faster data rate or a lower probability of bit error) than other codecs and compression schemes, each transmitting processor transmits at the best codec for which all intended recipients of the message can decompress. The codec thus selected is common to all recipients in the teleconference.

In other embodiments, the sending computer system groups the recipients into two or more groups according to the best codec available in each group of recipients, and sends a separate packet to each group or to each computer system in each group according to the best codec available on all recipients in the group. The codec thus selected is common to all recipients in the group. The latter approach is also applicable when multiple networks are linked together, and recipients are not all on one network; this may be the case when some recipients are located with the sender on the same local-area network while others are remotely located across a wide-area network, or when an inter-bus exchange is needed to transfer information to some recipients. Since each network may have different bandwidth availability, different codecs for each network may be appropriate.

According to some embodiments of the present invention, the consequent increase in available data rate made possible by an appropriate matching of compressors with decompressors generally makes up for any added complexity in the initiation messages. Due to the large number of compression and decompression algorithms and processes available, most embodiments of the present invention include an initial exchange of information between the sender and the recipient of a packet containing compressed data. The exchange of information contains information pertaining to the selection of the best codec. In one embodiment of the present invention, an automatic codec selector receives information from each recipient and from this information determines a list of decompressors available on each recipient member of a teleconference. The codec selector then eliminates from the list decompressors for which no compressor is available at the current processor. The sender ranks the compressors available at the sender after this elimination, from best to worst, according to some ordering preference. In one embodiment, this preference is overall data rate. Then the ranked list of compressors at the sender is compared or matched to the list of decompressors available on each recipient, and this comparison produces a ranked list of compressors for which there is a corresponding decompressor on each recipient. The sender then transmits data compressed according to the best compressor available on the sender for which there is a corresponding decompressor on each recipient.

Figure 5:
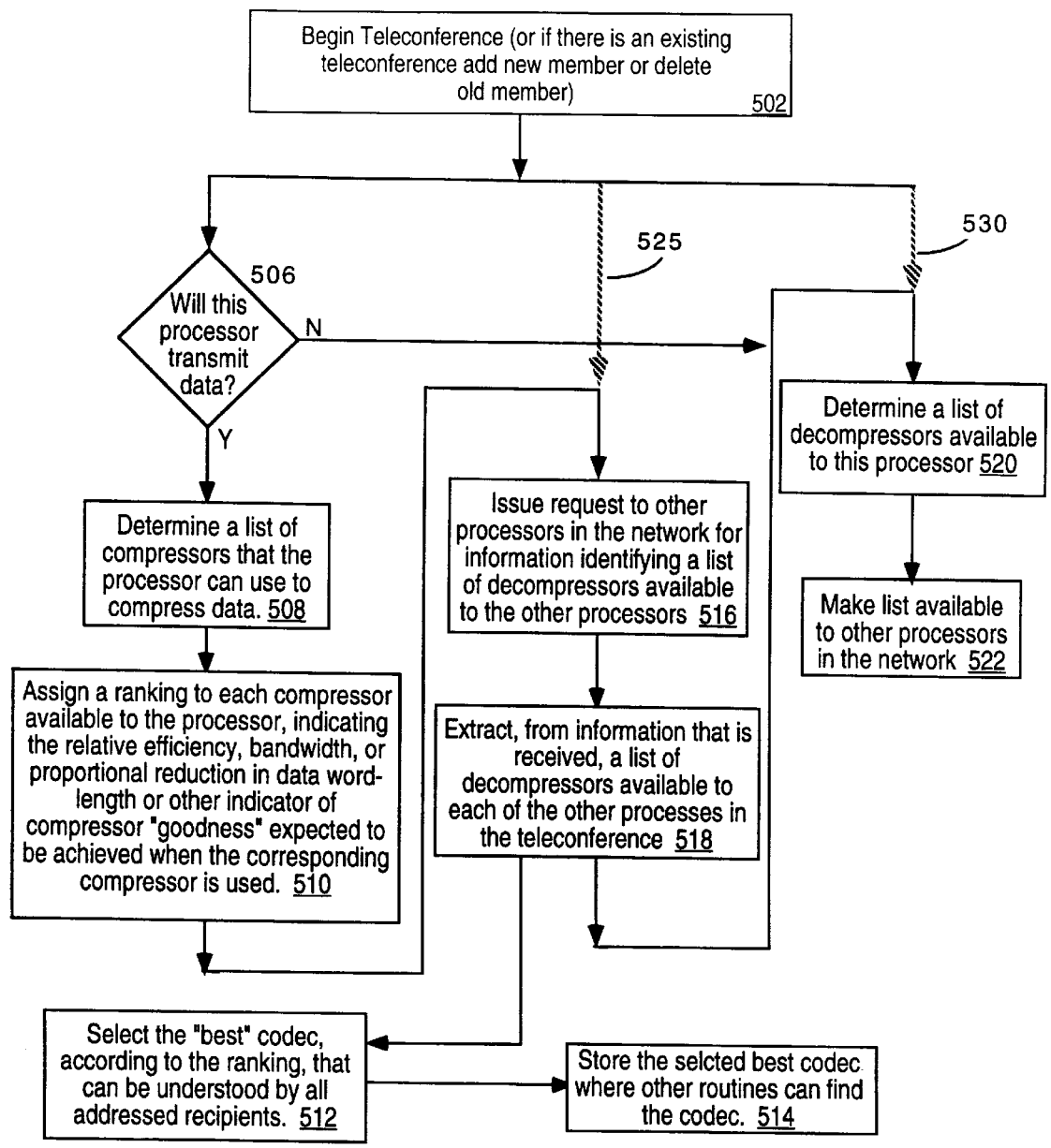
FIG. 5 shows a method according to one embodiment of the present invention.

An embodiment of the present invention is further shown in FIG. 5. In this embodiment, processors having teleconferencing applications join an ongoing teleconference by exchanging information with processors already participating in the teleconference. The embodiment shown in FIG. 5 is one example of a sequence of steps which are performed according to this example of the present invention. It will be appreciated that the various steps may be performed in a different sequence or certain steps may be omitted. For example, step 508 could be performed before step 502, and step 516 could be omitted. The embodiment shown in FIG. 5 begins in step 502 in which the teleconference begins (or if a teleconference exists, then adding a new member or deleting an old member to the existing teleconference). Typically, processing will then proceed to step 506 in which the processor determines whether it will be transmitting data in the teleconference. If it will not be transmitting data, then this receiving-only processing will proceed to step 520. Each processor that is transmitting data determines a list of compressors that the transmitting processor can use to compress data (step 508). Also, a ranking in step 510 may be assigned to each compressor by the processor having access to it. The ranking indicates the relative efficiency, bandwidth, or proportional reduction in data word-length or other indicator of compressor "goodness" expected to be achieved when the corresponding compressor is used. The ranking is typically predetermined. In some embodiments, the ranking is "hard-wired" into the codec selector; for example, the Road Pizza codec may always be ranked last. In other embodiments, a rankable value is included in each compressor, such that at start-up the codec selector determines the set of compressors available and ranks the compressors according to the rankable value. In some embodiments the ranking is determined at boot-up or at launch of a teleconference application; in other embodiments, the ranking is determined at initiation of each particular teleconference connection to the network.

As a separate step, the sender also determines a list of decompressors available to each of the recipient processes in the teleconference in steps 516 and 518. These steps are, in some embodiments, accomplished after the ranking has been assigned; in other embodiments (illustrated by the dashed arrow 525) this step is accomplished in parallel with the determining and ranking steps 508 and 510.

As stated above, the recipients are other teleconferencing processes running on processors or computer systems that can exchange data with the sender, generally over the network. The exchange of the list of decompressors occurs when the computer systems become identified to one another; after the address of each is identified to the other processors, during the initiation of the teleconference, or upon a new processor joining the teleconference. The processors thus "negotiate" a codec by exchanging a list of the decompressors available on each processor and application participating in the teleconference. The list of decompressors is provided in response to a request for the information initiated by a processor that may transmit compressed data, and thus needs to know what codec to use in compressing the data. As noted above, the negotiation process of the present invention may be performed several times, once for each stream of data which requires its own type of compression or decompression. Thus, video compression negotiation is performed in addition to audio compression negotiation when both video and audio data are transmitted.

Once the codecs on the sender are ranked and the set of codecs commonly available to all recipients (or all recipients in a given group) are identified, a codec is selected by the sender 512. The selected codec is the "best" codec at the sender, according to the ranking, that can be understood by all addressed recipients. Finally, the sender stores the selected codec such that the lower layer protocols can find the selected codec and begin compressing data according thereto 514.

As part of the negotiating process, a step of providing a list of decompressors over the network is performed in steps 520 and 522. These steps allow teleconferencing applications running on another processor in the network to select a codec on the other processor according to the illustrated embodiment of the present invention. This step of providing a list of decompressors is performed in some embodiments in parallel with the other steps, as shown by arrow 530; in other embodiments, the list is provided each time the set of processors participating in a teleconference changes.

The codec negotiation, including the exchange of lists of available decompressors, is in some embodiments accomplished as part of a larger exchange of capabilities during the establishment of a teleconference. In one embodiment, teleconferencing applications initiate or join a teleconference by exchanging information regarding their respective capabilities, to find a compatible structure for subsequent data transfer. A variable structure of capabilities is exchanged among processors in a network as the processors begin a teleconferencing process. The list of teleconferencing capabilities of each processor, including a list of codecs available, is included in a variable capabilities list that is exchanged before the establishment of the teleconference. This capabilities list includes an indication of whether a processor has available the H.261 codec, the RPZA (Road Pizza) codec, or the JPEG codec. Note that these examples are video compression examples. H.261 and JPEG are preferred Codecs in some applications and some embodiments, in that H.261 and JPEG can provide faster communication in some circumstances than the Road Pizza codec, which is available, however, on a much larger set of processors. For example, the Road Pizza codec is available on virtually all Macintosh computers, and all computers compatible with Macintosh computers, but may not be available on some other computer systems in a given network.

It will be understood, however, that the present invention is not limited to the embodiment described, and other Codecs or lists of Codecs can be included in the capabilities structure.

The capabilities structure can be implemented according to the following code:

```
typedef struct MTCapabilites3List {
    UInt32              count;
    MTCapabilitesEntry  capability1;
} MTCapabilities1List;
#define    k26lSubtype      'h261'
#define    kPizzaSubtype    'rpza'
#define    kJPEGSubtype     'jpeg'
MTCapabilities1List     gCapabilities = { 3,
                            { decompressorComponentType,1,
mtNegotiationMessageCapability,0 },
                        };
```

In this embodiment of the present invention, a processor having the ability to send compressed data according to any of multiple compressing algorithms resident thereon, selects a compressor compatible with the best of the decompressors common to all intended recipients. The above code is a simple embodiment in which only H.261 and Road Pizza are available on a transmitting processor, in which Road Pizza is available on all intended recipients, and in which H.261 is available on only some of the recipients; the transmitting processor sends data compressed according to the Road Pizza algorithm, since only the Road Pizza compressor will allow successful transmission and receipt of communications among all the participants in the teleconference.

Using a compressor compatible with the best decompressor available to all intended recipients provides an effective and efficient codec selector. In some embodiments, as processes on other systems join a teleconference, the appropriateness of a codec is re-evaluated. Such an embodiment is described in greater detail below. In other embodiments, when it is determined that at least one node has only a single codec available and that the codec is universally available, codec re-evaluation stops; since at least one node has only the worst codec, the worst codec is the only codec that can reach that node, so the worst codec is what is used. In still other embodiments of the present invention the processor also checks when a party leaves a teleconference, to determine whether a more efficient or better codec could be used.

Codec selection, however optimum, must occasionally be reevaluated. Codecs that have been an efficient compression/decompression scheme for a particular transmission can become inappropriate for a number of reasons. The elimination of video, the reduction in video image complexity, the elimination of certain video features, the turning-off of stereo in the sound channel, the reduction in frame update rate or window size, and other decisions made by the sender effect changes in the nature of data that simplify and improve data compression. When these changes take place, simpler codecs may be appropriate. Other changes can also indicate a change in codec would result in improved data transmission; for example, the loss of a transmission channel or bus may require switching to a transmission medium with a different data bandwidth capacity. Also, as new members join a teleconference or old members leave a teleconference, the set of computer systems and processes included in the teleconference changes, and consequently any particular process or system may be the only process or system having access to a particular codec. Therefore, codec re-selection may be indicated.

and prepares a response structure, including the ranking, so that when other processors in a network request a list of available codecs, the processor can respond appropriately. When the processor is asked for a list of codecs available thereon, the processor responds by indicating not only the codecs available, but also a ranking of preference from best to worst so that, if a sender and receiver have multiple codecs in common, the teleconference can proceed at a preferred compression algorithm allowing greater data throughput. An example of computer program code for implementing StartMovieTalk is provided below:

```
StartMovieTalk (
        void
){
        StringHandle      sh;
        MTCapabilitiesHandle    ch;
        ComponentInstance    acc;
        MTCnferencePrepFlags    flags;
        sh = GetString(kMTAppleTalkUserName);
        if(!sh || !*sh || !**sh)
                StopIt(rStopIt, 3);
        strncpy(gUserName, *sh+1, **sh);
        gCC = OpenDefaultDomponent(kMTConferenceType, kMTMovieTalkSubType);
        acc = MTConferenceAccessorize(gCC, kMTAllAutomaticAccessories);
        if((ComponentResult) acc > 0)
           gCC = acc;
        if(!gCC)
                StopIt(rStopIt, 5);
        if(gTVmode)
                MTConferenceSetMode(gCC, mtReceiveMediaModeMask);
        PtrToHand((Ptr) &gCapabilities, (Handle *) &ch, sizeof(gCapabilities));
        MTConferenceSetMessageCapabilties(gCC, ch);
        gServiceTypes = GetResource('srvt', rServiceTypes);
        HLock(gServiceTypes);
        if(!gTVmode) {
                MTConferenceSetPreparationDefaults(gCC, 0, kJPEGSubtype, 0, 0, 0);
           if(!gSouper)
                MTConferenceSetDefaultWindowProdD(gCC, noGrowDocProc);
           flags =
mtMediaSourcePrepMask+mtGrabVideoPrepMask+mtGrabAudioPrepMask+mtWindowVi
siblePrepMask+mtControllerVisiblePrepMask+mtEnableSnapshotPrepMask;
           gSelf = MTConferenceNewPreparedController(gCC,&gSelfBox,
                        gSouper ? flags + mtEnableRecordPrepMask : flags, 0);
           if(!gSelf)
                StopIt(rStopIt, 4);
           if(!gSouper)
                MTControllerDoAction(gSelf,
mControllerActionSetGrowBoxBounds, &gEmptyRect);//someone forgot a showGrow action . . .
        }
        MTConferenceSetDefaultWindowProdD(gCC, zoom DocProc);
        gBC = OpenDefaultComponent(kMtBrowserType, gBrowserType);
        if(!gBC)
           StopIt(rStopIt, 2);
        FindCodec(k261Subtype, bestSpeedCodec, &g261Codec, nil);
        FindCodec(kJPEGSubtype, bestSpeedCodec, &gJPEGCodec, nil);
}
```

In some embodiments, the codec selector operates only when a new member enters a teleconference, to determine whether a downgrade to a "worse" compressor is necessary. In other embodiments, the codec selector also determines, when a member to a teleconference leaves the teleconference group, whether an upgrade to a better compressor is possible.

In one embodiment, a process includes a sub process (referred to as StartMovieTalk) that determines the codecs available on the processor on which the process is running, In one embodiment of the present invention, the process detects the arrival of message events, and on the arrival of a message event performs the sub process referred to as DoMessageArrived.

The following computer program code ("DoConferenceEvent") can be used to detect an event such as the signing on or joining a teleconference by a new processor:

```
DoConferencEvent(
    MTConferenceEventPtr    ce
){
    switch(ce→what) {
    (case mtIncomingCallEvent:
        DoIncomingCall(ce);
    break;
    case mtConferenceReadyEvent:
        DoConfReady(ce);
            break;
    case mtConferenceTerminatedEvent:
        DoConfTerminated(ce);
            break;
    case mtMemberReadyEvent:
    DoMemberReady(ce);
            break;
    case mtMemberTerminatedEvent:
    DoMemberTerminated(ce);
            break;
    case mtPhoneRingingEvent:
        DoPhoneRinging(ce);
            break;
    case mtMessageArrivedEvent:
        DoMessageArrived(ce);
            break;
    case mtListenerStatusEvent:
        DoListenerStatus(ce);
            break;
    case mtRefusedEvent:
        Sorry(rUnfortunate, 1, MTConferenceGetMemberName(gCC, ce→who), ce→err);
            break;
    case mtFailedEvent:
        Sorry(rUnfortunate, 2, MTConferenceGetMemberName(gCC, ce→who),ce→err);
    }
    if(ce→surprise)
        DisposeHandle(ce→surprise);
}
DoMessageArrived(
    MTConferenceEventPtr    ce
){
    MemberPtr       mp;
    Handle          h;
    if(!(mp = FindMember(ce→who)))
        return;
    switch(ce→reserved){
    case decompressorComponentType:
        NoteCodec(mp, ce→surprise);
    }
}
```

In one embodiment of the present invention, a process referred to as DoMemberReady examines the information received from other processors and determines whether a different codec can be used or must be used when a new member joins a teleconference group and begins sending information. First, it is determined whether the new member can perform decompression using the H.261 algorithm. It will be understood, that although in the described embodiment reference is made to the H.261 algorithm, any preferred algorithm can be used. If (and, in some embodiments, only if) the new member to the teleconference group cannot use the preferred algorithm, in one embodiment a list of ranked algorithms is compared to the list of algorithms the new member to the teleconference group can use to decompress teleconference data, and a determination is made as to the best codec by which the current processor can compress data such that the new member to the teleconference group can decompress the data. If a different codec from the codec currently being used is indicated, a sub process Codec-Shuffle performs a change of codec.

Initially, CodecShuffle determines whether the best codec common to both lists (i.e., the list of decompressors usable on the new node, and the list of compressors available on the current processor) is currently being used. If it is, CodecShuffle completes its task. If the best codec common to both lists is not being used, information necessary to set the compressor to a different compression algorithm is provided. The video stream is temporarily disabled while the video compressor changes compression algorithms, and then is re-enabled for transmission according to the new compression algorithm. The new compression algorithm thus selected is the highest ranking compression algorithm for which a decompressor is available at the new node. According to one embodiment, if all nodes on the network participating in the teleconference have available H.261 (or the best codec available for the type of computer system used in the network), then CodecShuffle terminates and returns. If the new node can do H.261 or the best that exists, then CodecShuffle also terminates and returns. If the new node, however, cannot perform decompression of the data as compressed by the processors previously participating in the teleconference, then CodecShuffle determines whether the data currently being exchanged in the teleconference includes video data (i.e., video media type). As explained above, in a simple embodiment, a determination is simply made as to whether the new node can perform according to H.261. However, in a more complex embodiment, a full list of codecs available in the new node is transferred to the current processor, and the "best" selected and thereafter used by the current processor.

The processes DoMemberReady and CodecShuffle can be performed according to the following code:

```
DoMemberReady(
       MTConferenceEventPtr      ce
){
       MemberPtr              mp;
       MTControllerComponent    mtc;
       MTCfonferecePrepFlags    flags;
       if(!(mp = FindMember(ce→who)))
              return;
       if(ce→bonus & mtSendMediaModeMask)
              CodecShuffle( );
       else
              mp→can261 = -31 1;
       if(ce→bonus & mtReceiveMediaModeMask){
              if(mp→dialog){
                     DisposeDialog(mp→dialog);
                     mg→dialog - 0;
              }
              flags =
mtWindowVisiblePrepMask+mtControllerVisiblePrepMask+mtEnableSnapshotPrepMask+
mtAutoPositionPrepMask;
              if(!gAutoResize)
                     flags += mtNoAutoResizePrepMask;
              if(gTVmode || gSouper)
                     flags += mtEnableRecordPrepMask;
              if(gTVmode)
                     flags += mtAuxiliaryClosePrepMask;
              mp→controller = mtc;
       }else
              mtc = 0;
}
       MTConferenceActivateMember(gCC, ce→who, mtc);
       if(mtc){
              if(mp→setings.volume)
                     MTControllerDoAction(mp→controller,
mtControllerActionSetVolume, &mp→settings.volume);
              if(mp→settings.gain)
                     MTControllerDoAction(gSelf, mtControllerActionSetGain, &mp→settings.gain);
              SelectWindow((Window((WindowRef) MTControllerGetControllerPort(mtc));
       }
}
       void
CodecShuffle(
       void
)}
       MemberPtr          mp;
       MTDirectorComponent     sd;
       ComponentInstance       sg;
       SGchannel          chan;
       CSType             type;
       int                i;
       Boolean                    do261;
       if(!g261Codec)
              return;
       for(mp = (MemberPtr) gMembers.qHead; mp; mp = (MemberPtr) mp→qLink)
              if(!mp→can261)
                     break;
       do261 = !mp;
       if(do261 = gDoing261)
              return;
       sd = MTControllerGetStreamDirector(gSelf);
       MTDirectorGetMediaComponent(sd, &sg, &type, &type);
       for(i = 1, chan = 0; SGGetIndChannel(sg, i, &chan, &type) = noErr; i++)
              if(type = VideoMediaType)
                     break;
              else
                     chan = 0
       if(!chan)
              return;
       MTDirectorChangedStreamFormats(sd, false);
       if(do261){
              SGSetVideoCompressorType(chan, k261Subtype);
```

-continued

```
        SGSetVideoCompressor(chan, 0, g261Codec, codecNormalQuality, 0, 0);
    }else{
        SGSetVideoCompressorType(chan, kJPEGSubtype);
        SGSetVideoCompressor(chan, 0, gJPEGCodec,codecNormalQuality,
codecNormalQuality, 17);
    }
    MTDirectorChangedStreamFormats(sd, true);
    gDoing261 = do261;
}
NoteCodec(
    MemberPtr     mp,
    Handle        h
){
    CodecTypePtr     p;
    int              n;
    n = GetHandleSize(h)/sizeof(CodecType);
    for(p = (CodecTypePtr) *h; -n >= 0; p++)
        if(*p = k261Subtype){
            mp→can261 = 1;
            break;
        }
}
```

Various systems of the present invention may be implemented in hardware, including a system in auxiliary hardware which may reside in a printed circuit board card in an expansion slot of a computer system. Alternatively, the present invention may be practiced substantially in software by storing the necessary structures and lists, data and computer programs in a general purpose memory and/or computer readable media (e.g., hard disk) which is a memory of a computer system. This memory is coupled to a processor of the computer system so that the processor may execute the computer programs stored in the memory in order to operate on the data and the structure stored in the memory to perform the codec selection according to the present invention.

Figure 6:
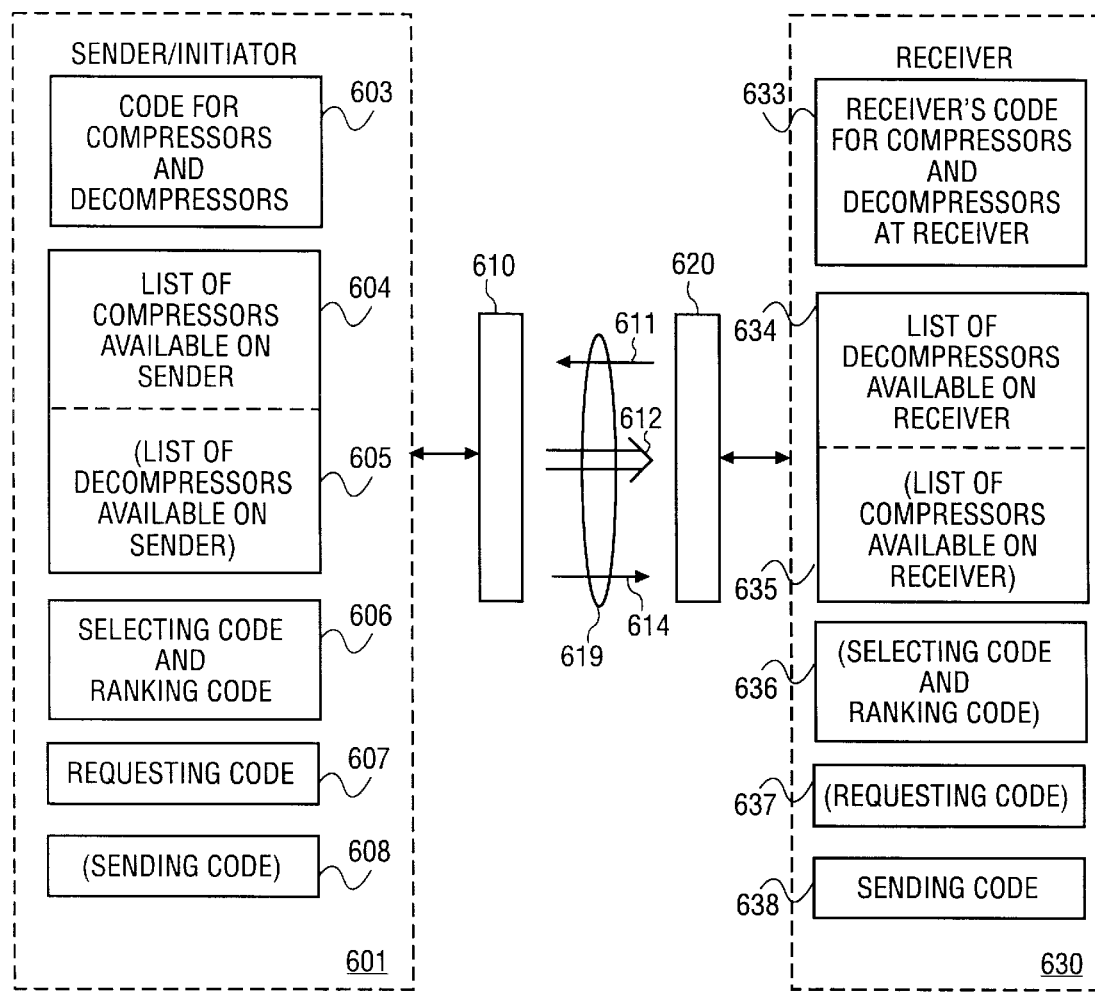
FIG. 6 shows such an embodiment of a computer readable medium containing a set of program instructions that, when executed by a digital processing system, cause the system to perform steps according to one embodiment of the present invention.

The code set forth above in the description of one embodiment of the present invention can be stored in a computer readable medium such as a main memory (e.g., RAM), a read only memory, or a mass storage device, or in other internal or external storage devices such as magnetic discs or other media. FIG. 6 shows such an embodiment of the invention where a computer readable medium contains a set of program instructions that, when executed by a processor of a computer system, perform steps according to one embodiment of the present invention. It will be appreciated that other structures for storing programs are available, and that some systems provide several different sources or storage of stored programs to the same processor. For example, application-level programs may be stored in main-memory or on a magnetic disc, while lower layer programs may be stored in a special cache or in ROM.

The computer readable media of two digital processing systems are shown in FIG. 6. One such system is shown as a "sender/initiator" as it will transmit compressed teleconference data or initiate a teleconference (and then transmit compressed teleconference data). The other such system is shown as a "receiver" as it will receive compressed teleconference data and then decompress it (usually in order to display the decompressed data as a video image). The computer readable media 601 of the sender includes computer program instructions (e.g., "code") for various compressors and decompressors 603. This code 603, when executed on a digital processing system of the sender, will compress or decompress, depending on the mode of operation, a stream of data. Also included in the computer readable media 601 is a list 604 of compressors available on the sender. This list will typically match the various compressors for which there is code 603. However, it is possible that the user at startup time or at some other time has limited the particular compressors which will be made available and therefore the list of those compressors does not match compressors for which there is code in the memory 603. Also included on the computer readable media 601 is a list 605 of decompressors available on the sender. In the embodiment where the sender system does not receive data which is compressed, this list is not necessary and hence has been shown in parentheticals. Also included in the computer readable media 601 of the sender is code 606 for selecting and ranking the compressors which are either available as specified in the list 604 or for which there is code in the code storage 603. The computer readable media 601 also includes requesting code 607 which requests information from a receiving system, which information identifies the decompression capabilities at the receiving system according to the present invention. The computer readable media 601 also includes sending code 608 which may be used by the sending system to send information regarding the decompression capabilities of the sender system (as specified by either the list 605 or the available decompressors in the storage 603) when the sender system also functions as a receiver of compressed data which needs to be decompressed.

A communication port 610 for the sending system is also shown; this communication port may, for example, be the communication device 327 which provides a port through which transmissions may occur to and from the sending system. A communication medium 619 is also shown along with messages being sent, usually at different times, along the communication media. In particular, the message 611 comprises the information which identifies the decompression capabilities at the receiver system. The information 612 comprises the compressed data sent from the sender after negotiation and selection of the codec. The message 614 comprises the request generated by the requesting code 607 on the sender and requests information specifying the decompression capabilities at the receiver. It will be appreciated that these messages which are passed along the communication medium 619 occur at various times as described herein and do not necessarily occur simultaneously or in any predetermined order, but rather occur in accordance with the description of the present invention. Messages reach the receiving system at communication port 620, which may again be an interface device such as the interface device 327 shown in FIG. 3 for the receiving system.

The receiving system includes a computer readable media 630. This computer readable media 630 includes computer program instructions (e.g., "code") for various compressors and decompressors 633. This code 633 provides the compression and decompression capabilities at the receiver. Also in the computer readable media 601 of the receiver there is a list 634 of decompressors which are available on the receiver. This list 634 may match the decompressor code stored in 633 if the system has been configured to use all available code; however, it is possible to limit the configuration of the system such that only certain of the decompressors are listed as being available on the receiver 634. Also stored in the computer readable media 601 of the receiver is a list 635 of compressors which are available on the receiver, which list may be used when the receiver becomes a sender either in the same teleconference with the sending system shown in FIG. 6 or a different teleconference. The receiver shown in FIG. 6 also includes, in its computer readable media 630, sending and ranking code 636 which is used when the receiver system becomes a sending system; this code 636 will be used in that case in order to select and rank available compressors on the receiver system in the case when the receiver system also functions as a sending system. The computer readable media 630 of the receiver also includes requesting code 637 which may be used by the receiver system when it functions as a sending system in order to request information regarding the decompression capabilities from other systems which are functioning as receivers in that case. The computer readable media 630 of the receiver shown in FIG. 6 also includes sending code 638 which is used to send information concerning the decompression capabilities at the receiver. This sending code 638 responds to the information request message 614 which is generated by the requesting code 607 in the sender system.

According to a typical implementation of the present invention, the sending system shown in FIG. 6 will generate a request message 614 by using the requesting code 607 to generate the request. This request is transmitted through a communication port 610 and through the communication medium 619 to the communication port 620. The request is received by the receiving system and the sending code 638 decodes the request and in response generates information specifying the available decompressors on the receiver system. This information is transmitted through the communication port 620 as message 611 which is transmitted through the communication medium 619 and is received at the sending system. This information is used by the selecting and ranking code 606 according to the present invention in order to select a compressor which is available on the sending system as specified by the list 604. The selected compressor is then activated such that the code 603 for that compressor is used to compress data to be transmitted through the communication medium 619. This compressed data is shown as the message 612.

It will be appreciated that the receiving system may also function as a sending system in sending, for example, video data from the receiving system to the sending system. Similarly, the sending system in this case will also be a receiving system.

Although the present invention will be understood more fully from the detailed description given above and from the accompanying drawings of various embodiments of the invention, the description and drawings should not be taken to limit the invention to the specific embodiments, but are for explanation and understanding only. It will be apparent to one of ordinary skill in the art that the present invention may be practiced without these specific details.

What is claimed is:

1. A method for selecting a codec for sending a compressed data message in a video teleconferencing application from a sending system coupled to a plurality of receiving systems through a communication medium, each codec having a compressor for compressing data at the sending system and a decompressor at each of the plurality of receiving systems associated therewith, the sending system having at least two compressors available, said method comprising selecting a codec having a compressor at the sending system, the codec selected by:

sending, by the sending system, a request for information to each of the plurality of receiving systems, wherein the request requests information that specifies all decompression processes available on the receiving system;

receiving, by the sending system, a single message from each of the plurality of receiving systems containing the information in response to the request for the information sent by the sending system;

generating, by the sending system, from the received information, a first list comprising common decompression processes available on each of the plurality of receiving systems;

eliminating, by the sending system, from the first list decompression processes having no corresponding compression process on the sending system;

generating, by the sending system, a second list comprising compression processes of the sending system, wherein the second list is rank ordered;

comparing, by the sending system, the second list to the first list;

generating, by the sending system, a third list comprising compression processes of the sending system corresponding to the common decompression processes, wherein the third list is rank ordered; and compressing, by the sending system, data using a highest ranked compression process available on the third list.

2. The method as set forth in claim 1, wherein selecting a codec further comprises:

ranking the codecs having compressors associated therewith that are available to the sending system, said ranking being according to a predetermined ranking associated with each of the codecs;

determining a first list of codecs, the first list including only codecs that have a decompressor commonly available to all of the plurality of receiving systems;

determining a second list of codecs, said second list including only the codecs on said first list that also have a compressor available to the sender;

selecting a codec at the sending system, said codec being selected from said second list according to the ordering of the codecs.

3. The method as set forth in claim 1, wherein selecting a codec further comprises:

ranking the codecs having compressors associated therewith that are available to the sending system, said ranking being according to a predetermined ranking associated with each of the codecs;

determining a first list of codecs, each codec on the first list having a decompressor available to at least one receiving system, each codec on said first list also having associated therewith a roster of all of the plurality of receiving systems in the teleconference that had decompressors corresponding to said codec;

determining a second list of codecs, said second list including only the codecs on said first list that also have a compressor available to the sender;

selecting the codec from said second list according to the ranking.

4. The method of claim 3, further comprising:

upon receiving a teleconference request message from a processor not currently included in a teleconference that requests inclusion in the teleconference, updating the first list of codecs available to at least one receiving system to include codecs available to the processor issuing the teleconference request message.

5. The method of claim 4, further comprising:

upon receiving either a teleconference request message or a teleconference termination message, the teleconference request message indicating that a processor not currently included in a teleconference requests inclusion in the teleconference, the teleconference termination message indicating that a processor currently included in the teleconference is terminating inclusion in the teleconference, updating the first list of codecs to include codecs available to the processor issuing the teleconference request message or to remove codecs uniquely available only to the processor issuing the teleconference termination message.

6. The method of claim 1, further comprising:

issuing a teleconference request message by a processor; and providing a list of codecs, the list of codecs including codecs that are available to teleconferencing applications currently running on the processor.

7. The method of claim 1, further comprising:

issuing a teleconference request message by a processor; and providing a list of codecs, the list of codecs including codecs that are available to teleconferencing applications currently running on the processor and also including codecs that are launchable on the processor.

8. The method of claim 1, further comprising:

receiving at a processor a teleconference request message; and in response to the teleconference request message, providing a list of codecs, the list of codecs including codecs that are available to teleconferencing applications currently running on the processor.

9. The method of claim 1, further comprising:

receiving at a processor a teleconference request message; and in response to the teleconference request message, providing a list of codecs, the list of codecs including codecs that are available to teleconferencing applications currently running on the processor and also including codecs that are launchable on the processor.

10. In a network of processors having a plurality of recipient processors and a sender processor, each of said recipient processors having available thereon at least two processes for decompressing compressed data received by said sender processor from said network, said sender processor having at least two processes for compressing data, a method of selecting a process for compressing data, said method comprising:

sending, by the sending processor, a request for information to each of the plurality of recipient processors, wherein the request requests information that specifies all decompression processes available on the recipient processor;

receiving, by the sender processor, a single message from each of the plurality of recipient processors containing the information in response to the request for the information sent by the sender processor;

generating, by the sender processor, from the received information, a first list comprising common decompression processes available on each of the recipient processors;

eliminating, by the sender processor, from the first list decompression processes having no corresponding compression process on the sender processor;

generating, by the sender processor, a second list comprising compression processes of the sender processor, wherein the second list is rank ordered;

comparing, by the sender processor, the second list to the first list;

generating, by the sender processor, a third list comprising compression processes of the sender processor corresponding to the common decompression processes, wherein the third list is rank ordered; and compressing, by the sender processor, data using a highest ranked compression process available on the third list.

11. The method of claim 10, further comprising:

switching from a first codec to a second codec when a system lacking the first codec but having the second codec begins receiving said compressed data.

12. A digital processing system comprising:

a plurality of recipient processors coupled to a communication medium, each of said recipient processors comprising at least one decompressor, each of said recipient processors providing decompressor information that specifies all decompressors available on the recipient processor;

at least one sender processor comprising a plurality of compressors coupled to a communication medium, said sender processor providing compressor information that specifies the plurality of compressors; and a selector coupled to said communication medium, said selector receiving a single message containing said decompressor information from each of the plurality of recipient processors in response to a request for the decompressor information sent by the sender processor and further receiving said compressor information, said selector selecting one of said compressors, said selected compressor being compatible with at least one of said decompressors that is common among the plurality of said recipient processors, wherein the selector is configured to:
   generate a first list comprising common decompression processes available on each of the plurality of recipient processors;
   eliminate from the first list decompression processes having no corresponding compression process on the at least one sender processor;
   generate a second list comprising compression processes of the at least one sender processor, wherein the second list is rank ordered;
   compare the second list to the first list;
   generate a third list comprising compression processes of the at least one sender processor corresponding to the common decompression processes, wherein the third list is rank ordered; and
   compress data using a highest ranked compression process available on the third list.

13. A digital processing system as in claim 12, wherein said selector ranks said compressors to provide ranked compressors, said selector identifies said decompressors compatible with at least one of said ranked compressors, said selector compares said identified decompressors with said ranked compressors.

14. A digital processing system as in claim 12, wherein said selector identifies decompressors available on each of said recipient processors, said selector eliminates decompressors not compatible with at least one of said compressors to provide compatible decompressors, said selector ranks said compressors to provide ranked compressors, said selector compares said compatible decompressors with said ranked compressors to provide compatible compressors, wherein each of said compatible compressors is compatible with at least one decompressor from each of said recipient processors.

15. A digital processing system as in claim 14, wherein each of said ranked compressors are ranked according to a predetermined value associated with each of said compressors.

16. A digital processing system as in claim 15, wherein each of said predetermined values is a data rate.

17. A digital processing system as in claim 16, wherein said selected compressor compresses data at a highest data rate, wherein said at least one sender processor transmits said compressed data to said recipient processors.

18. A method for dynamic selection of compression processing during teleconference call initiation, the method comprising:
   sending, by at least one sending processor, a request for information to each of a plurality of recipient processors, wherein the request requests information that specifies all decompression processes available on the recipient processor;
   receiving, by the at least one sender processor, a single message from each of the plurality of recipient processors containing the information in response to the request for the information sent by the at least one sender processor;
   generating, by the at least one sender processor, from the received information, a first list comprising common decompression processes available on each of the plurality of recipient processors;
   eliminating, by the at least one sender processor, from the first list decompression processes having no corresponding compression process on the at least one sender processor;
   generating, by the at least one sender processor, a second list comprising compression processes of the at least one sender processor, wherein the second list is rank ordered;
   comparing, by the at least one sender processor, the second list to the first list;
   generating, by the at least one sender processor, a third list comprising compression processes of the at least one sender processor corresponding to the common decompression processes, wherein the third list is rank ordered; and
   compressing, by the at least one sender processor, data using a highest ranked compression process available on the third list.

19. A method for controlling transmission of data from a digital processing system, the method comprising:
   sending, by at least one sending processor, a request for information to each of at least one recipient processor, wherein the request requests information that specifies all decompression processes available on the recipient processor;
   receiving, by the at least one sender processor, a single message from the at least recipient processor containing the information in response to the request for the information sent by the at least one sender processor;
   generating, by the at least one sender processor, from the received information, a first list comprising common decompression processes available on each of the at least one recipient processor;
   eliminating, by the at least one sender processor, from the first list decompression processes having no corresponding compression process on the at least one sender processor;
   generating, by the at least one sender processor, a second list comprising compression processes of the at least one sender processor, wherein the second list is rank ordered;
   comparing, by the at least one sender processor, the second list to the first list;
   generating, by the at least one sender processor, a third list comprising compression processes of the at least one sender processor corresponding to the common decompression processes, wherein the third list is rank ordered; and
   compressing, by the at least one sender processor, data using a highest ranked compression process available on the third list.

20. A digital processing system that controls transmission of data in a teleconferencing application, the digital processing system comprising:
   a means for sending, by at least one sender processor, a request for information to each of a plurality of recipient processors, wherein the request requests information that specifies all decompression processes available on the recipient processor;
   a means for receiving, by the at least one sender processor, a single message from each of the plurality of recipient processors containing the information in response to the request for the information sent by the at least one sender processor;

a means for generating, by the at least one sender processor, from the received information, a first list comprising common decompression processes available on each of the plurality of recipient processors;

a means for eliminating, by the at least one sender processor, from the first list decompression processes having no corresponding compression process on the at least one sender processor;

a means for generating, by the at least one sender processor, a second list comprising compression processes of the at least one sender processor, wherein the second list is rank ordered;

a means for comparing, by the at least one sender processor, the second list to the first list;

a means for generating, by the at least one sender processor, a third list comprising compression processes of the at least one sender processor corresponding to the common decompression processes, wherein the third list is rank ordered; and a means for compressing, by the at least one sender processor, data using a highest ranked compression process available on the third list.

21. A computer readable medium containing executable instructions which, when executed in a processing system, causes the system to perform the steps for a method for controlling transmission of data from the processing system, the method comprising:

sending, by at least one sending processor, a request for information to at least one recipient processor, wherein the request requests information that specifies all decompression processes available on the at least one recipient processor;

receiving, by the at least one sender processor, a single message containing the information in response to a request for the information sent by the at least one sender processor;

generating, by the at least one sender processor, from the received information, a first list comprising common decompression processes available on each of the at least one recipient processor;

eliminating, by the at least one sender processor, from the first list decompression processes having no corresponding compression process on the at least one sender processor;

generating, by the at least one sender processor, a second list comprising compression processes of the at least one sender processor, wherein the second list is rank ordered;

comparing, by the at least one sender processor, the second list to the first list;

generating, by the at least one sender processor, a third list comprising compression processes of the at least one sender processor corresponding to the common decompression processes, wherein the third list is rank ordered; and compressing, by the at least one sender processor, data using a highest ranked compression process available on the third list.

* * * * *